(12) United States Patent
Xia et al.

(10) Patent No.: US 11,366,569 B2
(45) Date of Patent: Jun. 21, 2022

(54) INTERACTIVE INTERFACE DISPLAY METHOD, APPARATUS AND STORAGE MEDIUM

(71) Applicant: BEIJING XIAOMI MOBILE SOFTWARE CO., LTD., Beijing (CN)

(72) Inventors: Yuhang Xia, Beijing (CN); Zekui Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/817,054

(22) Filed: Mar. 12, 2020

(65) Prior Publication Data
US 2020/0310600 A1 Oct. 1, 2020

(30) Foreign Application Priority Data
Mar. 28, 2019 (CN) .......................... 201910245548.5

(51) Int. Cl.
*G06F 3/0482* (2013.01)
*G06F 3/0484* (2022.01)
(52) U.S. Cl.
CPC .......... *G06F 3/0482* (2013.01); *G06F 3/0484* (2013.01)
(58) Field of Classification Search
CPC ...... G06F 3/014; G06F 3/0482; G06F 3/0488; G06F 3/0412; G06F 3/04842; G06F 3/167; G06F 3/04817; G06F 40/205; G06F 40/226; G06F 16/248; G06F 16/243; G06F 16/3344; G06F 16/245; G06F 16/583
See application file for complete search history.

(56) References Cited

U.S. PATENT DOCUMENTS 8,543,397 B1 * 9/2013 Nguyen ............. G06F 3/04883
704/235
8,726,182 B1 * 5/2014 Murphy ............. G06F 3/04817
715/772
(Continued)

FOREIGN PATENT DOCUMENTS

CN 106886364 6/2017
CN 108549560 9/2018
(Continued)

OTHER PUBLICATIONS

Extended European search report dated Aug. 19, 2020 in corresponding European Patent Application No. 20164517.3, 10 pages.
(Continued)

*Primary Examiner* — Dong Hui Liang
(74) *Attorney, Agent, or Firm* — Oblon, McClelland, Maier & Neustadt, L.L.P.

(57) ABSTRACT

The disclosure relates to an interactive interface display method, apparatus, and storage medium. The method includes displaying an information display interface including a call entry of an intelligent interactive application; calling the intelligent interactive application when a trigger operation on the call entry is detected; displaying a first dynamic effect in which the call entry moves in the information display interface; and displaying an interactive interface of the intelligent interactive application after displaying the first dynamic effect in which the call entry moves in the information display interface.

16 Claims, 10 Drawing Sheets

(56) References Cited

U.S. PATENT DOCUMENTS

| | | | |
|---|---|---|---|
| 2007/0150842 A1* | 6/2007 | Chaudhri | H04M 1/663 715/863 |
| 2008/0168402 A1 | 7/2008 | Blumenberg | |
| 2013/0159965 A1 | 6/2013 | Karatal et al. | |
| 2013/0191910 A1* | 7/2013 | Dellinger | G06F 21/36 726/19 |
| 2013/0322634 A1* | 12/2013 | Bennett | H04R 5/00 704/274 |
| 2013/0325481 A1 | 12/2013 | van Os et al. | |
| 2014/0143791 A1* | 5/2014 | Mark | H04W 4/027 719/318 |
| 2014/0218372 A1 | 8/2014 | Missig et al. | |
| 2014/0282254 A1* | 9/2014 | Feiereisen | G06F 3/04883 715/835 |
| 2016/0077793 A1* | 3/2016 | Disano | G06F 3/04883 715/728 |
| 2016/0084668 A1 | 3/2016 | van Os et al. | |
| 2016/0170815 A1* | 6/2016 | Scholz | G06F 9/544 719/312 |
| 2018/0195872 A1 | 7/2018 | Bennett et al. | |
| 2018/0335312 A1 | 11/2018 | Bennett et al. | |
| 2019/0137293 A1 | 5/2019 | van Os et al. | |
| 2019/0145792 A1 | 5/2019 | van Os et al. | |

FOREIGN PATENT DOCUMENTS

| | | |
|---|---|---|
| CN | 109032898 | 12/2018 |
| WO | WO 2018/120945 A1 | 7/2018 |

OTHER PUBLICATIONS

Lisa Dziuba: "Everything you need to know about Loading Animations by Lisa Dziuba Flawless iOS Medium", XP055720914, Mar. 19, 2019, pp. 1-18, Retrieved from the Internet: URL:https://medium.com/flawless-app-stories/everything-you-need-to-know-about-loading-animations-10db7f9b61 e [retrieved on Aug. 7, 2020].
First Office Action issued in corresponding Chinese Application No. 201910245548.5 dated Sep. 3, 2021 (with English translation) (34 pages).
Summons to attend oral proceedings pursuant to Rule 115(1) EPC and communication from the Examining Division of European application No. 20164517.3 dated Aug. 27, 2021.

* cited by examiner

INTERACTIVE INTERFACE DISPLAY METHOD, APPARATUS AND STORAGE MEDIUM

CROSS-REFERENCE TO RELATED APPLICATIONS

This application is based on and claims priority to Chinese Patent Application No. 201910245548.5, filed on Mar. 28, 2019, the entire contents of which are incorporated herein by reference.

TECHNICAL FIELD

The present disclosure relates to the field of computer technology, and in particular, to an interactive interface display method, apparatus, and storage medium.

BACKGROUND

With the rapid development of artificial intelligence technology and the widespread popularity of electronic devices, intelligent interactive applications have become commonly used applications in people's daily life. Intelligent interactive applications can be called to interact with users and reply to questions raised by the users, and can also control the electronic device according to the user's instructions, which greatly simplifies the user's operation and improves the operation efficiency.

In the related art, the electronic device is configured with a designated button, and the intelligent interactive application is usually called by pressing the designated button. That is, in the case where the electronic device displays any information display interface, when an operation of pressing the designated button is detected and it is determined that a call instruction of the intelligent interactive application is received, the intelligent interactive application is called, and a first application interface is directly switched to an interactive application interface of the intelligent interactive application.

Because the information display interface is directly switched to the interactive interface, the interface switching mode is too rigid and the display effect is not good.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for interactive interface display. The method includes displaying an information display interface including a call entry of an intelligent interactive application; calling the intelligent interactive application when a trigger operation on the call entry is detected; displaying a first dynamic effect in which the call entry moves in the information display interface; and displaying an interactive interface of the intelligent interactive application after displaying the first dynamic effect in which the call entry moves in the information display interface.

According to an aspect, when displaying the interactive interface of the intelligent interactive application after displaying the first dynamic effect in which the call entry moves in the information display interface, the method further includes displaying the first dynamic effect in which the call entry gradually moves from an original position to a target position in the information display interface; and displaying the interactive interface when the call entry is located at the target location and the intelligent interactive application is called successfully.

According to another aspect, when displaying the interactive interface when the call entry is located at the target location and the intelligent interactive application is called successfully, the method further includes displaying the interactive interface when the call entry moves to the target position and the intelligent interactive application has been called successfully; or when the call entry moves to the target location and the intelligent interactive application has not been called successfully, displaying a second dynamic effect in which the call entry stays at the target location until the intelligent interactive application is called successfully.

In an example, the information display interface includes a search bar, the original position is located at a first end of the search bar, and the target position is located at a second end of the search bar.

In another example, the first dynamic effect is that the call entry gradually moves from the first end to the second end, and with a movement of the call entry, the search bar in an area passed by the call entry disappears.

According to an aspect, when displaying an interactive interface of the intelligent interactive application after displaying the first dynamic effect that the call entry moves in the information display interface, the method further includes displaying the first dynamic effect in which the call entry moves in the information display interface until the calling of the intelligent interactive application is completed.

According to another aspect, the method further includes, when it is determined that the intelligent interactive application is called unsuccessfully, displaying a third dynamic effect in which the call entry gradually moves to an original position in the information display interface.

According to yet another aspect, the method further includes, when a close operation on the interactive interface is detected, displaying a fourth dynamic effect in which the call entry gradually moves to an original position in the information display interface after the interactive interface is closed.

According to yet another aspect, the method further includes displaying a fifth dynamic effect when a close operation on the interactive interface is detected, the fifth dynamic effect being that after the interactive interface is closed, the call entry gradually moves from the second end to the first end, and with the movement of the call entry, the search bar in an area passed by the call entry appears.

Aspects of the disclosure also provide an apparatus for interactive interface display. The apparatus includes a processor and a memory for storing instructions executable by the processor. The processor is configured to display an information display interface including a call entry of an intelligent interactive application; call the intelligent interactive application when a trigger operation on the call entry is detected; display a first dynamic effect in which the call entry moves in the information display interface; and display an interactive interface of the intelligent interactive application after displaying the first dynamic effect in which the call entry moves in the information display interface.

Aspects of the disclosure also provide a non-transitory computer-readable medium storing instructions that, when executed by one or more processors of a device, cause the device to display an information display interface including a call entry of an intelligent interactive application; call the intelligent interactive application when a trigger operation on the call entry is detected; display a first dynamic effect in which the call entry moves in the information display interface; and display an interactive interface of the intelligent interactive application after displaying the first dynamic effect in which the call entry moves in the information display interface.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

Figure 1:
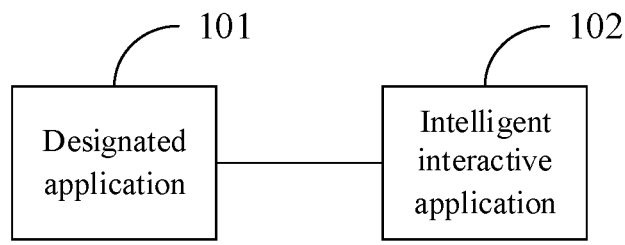
FIG. 1 is a schematic structural diagram of an electronic device according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Before explaining the aspects of the present disclosure in detail, the concepts involved in the aspects of the present disclosure are briefly introduced:

Information display interface: an interface for displaying information on an electronic device, which may include a main interface, a designated interface, an application interface of an application, or other interfaces.

(1) Main interface: an interface that is automatically displayed when the electronic device is turned on or unlocked.

The main interface may include application icons of multiple applications. A user may trigger any application icon to launch an application corresponding to the application icon. The main interface may further include a background image, which is used as a wallpaper to enhance the display effect of the main interface. The background image may be set automatically by the electronic device or set by the user. The main interface may also include some information commonly used by the user, such as current time information, network connection conditions, and so on.

(2) Designated interface: a designated information display interface on the electronic device, configured to aggregate and display multiple types of information.

The designated interface is an interface besides the main interface of the electronic device and the application interface of the installed application, such as a negative one-screen interface. The negative one-screen interface can be the leftmost information display interface among multiple information display interfaces. Performing an operation of sliding right on the main interface can call the negative one-screen interface.

The designated interface includes at least one information display area. Each information display area can display one or more types of information. The designated interface can aggregate and display multiple types of information.

In a possible implementation, the designated interface includes at least one of a first information display area, a second information display area, and a third information display area.

1. The first information display area: may be referred to as a shortcut function area.

The first information display area is configured to display one or more function options for use by a user.

The function options may include a launch option of an application, a launch option of an application interface, and a launch option of a tool.

The launch option of an application is configured to launch the application, and may be an application icon or a launch button of the application. When a user triggers the launch option, the electronic device can start the application.

The launch option of an application interface is configured to launch the application interface. The application interface may be an interface running in the operating system of the electronic device or an interface running in a third-party application, such as a permission setting interface running in the operating system, or a chat interface in a chat application. When the user triggers the launch option, the electronic device can launch the application interface, that is, it is not required to display the main interface of the application to which the application interface belongs or other interfaces but to directly display the application interface.

The launch option of a tool is configured to launch the tool. The tool can be a scan, a calculator, an alarm clock, a memo, and the like. When the user triggers the launch option, the tool is launched.

2. The second information display area: may be referred to as a dynamic information area.

The dynamic information area is configured to display dynamic information recommended by the electronic device for a user, such as popular news, popular products, train tickets, movie tickets, schedule information, stock quotes, travel strategies, and the like. The user can view the dynamic information and can also trigger the dynamic information to enter a display interface of the dynamic information. The display interface includes description information of the dynamic information. The user can learn the details of the dynamic information in the display interface. One or more operations can be triggered to process objects involved in the dynamic information.

For example, the dynamic information is a popular product, and the user clicks on the popular product to enter a display interface of the popular product. The display interface includes description information such as the type, price, size, and style of the popular product which describes the product from various aspects. The user can view the description information and trigger the operation of purchasing the product.

The recommended dynamic information may be updated over time or according to an operation triggered by the user. The electronic device updates the displayed dynamic information in the second information display area to display the updated dynamic information.

3. The third information display area: may be referred to as a display area. The third information display area can display some information commonly used by the user, such as time information, weather information, and number of exercise steps. The type of information displayed in the third information display area may be set by the electronic device by default or set by the user.

It should be noted that the designated interface may further include other information display areas, and may display other types of information, and details are not described herein again. Moreover, the information in the designated interface may be provided by the operating system of the electronic device, or provided by a third-party application installed on the electronic device, or may be provided by other channels. Integrating the information provided by one or more channels and displaying it on the designated interface in different regions realize the aggregate display of multiple types of information and ensure the orderliness and convenience of unified viewing by the user.

FIG. 1 is a schematic structural diagram of an electronic device according to an exemplary aspect. Referring to FIG. 1, the electronic device includes a designated application 101 and an intelligent interactive application 102. The designated application 101 is connected to the intelligent interactive application 102.

The intelligent interactive application 102 may provide an interface for the designated application 101. The designated application 101 may call the intelligent interactive application 102 by calling the interface. The designated application 101 is configured to control the display of an information display interface. The intelligent interactive application 102 is configured to control the display of an interactive interface.

In a possible implementation, the designated application 101 is an operating system, and the information display interface may be a main interface, a setting interface, and the like the display of which is controlled by the operating system. Alternatively, the designated application 101 is a third-party application, and the information display interface may be an application interface of the third-party application. Alternatively, the designated application 101 may also be another application running in the electronic device.

Figure 2:
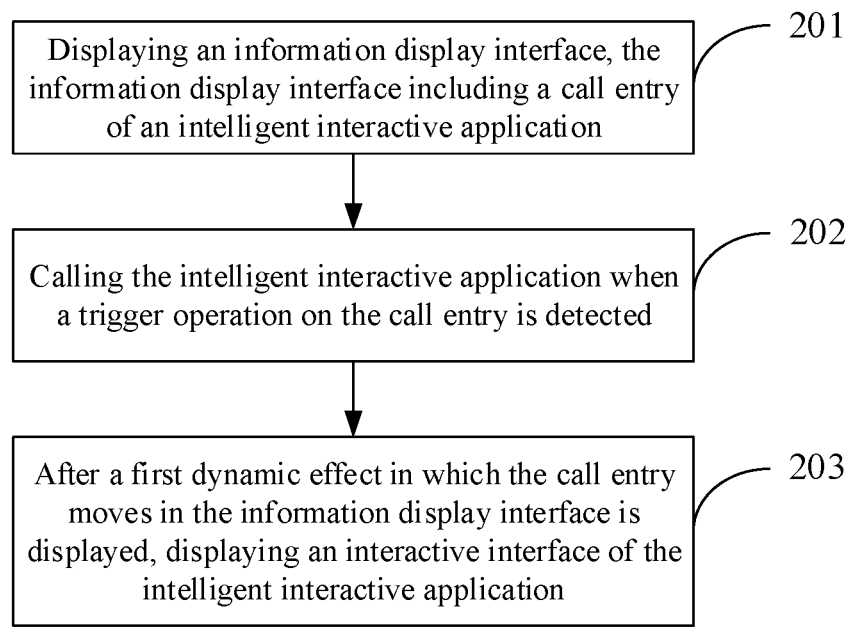
FIG. 2 is a flowchart of an interactive interface display method according to an exemplary aspect of the present disclosure.

FIG. 2 is a flowchart of an interactive interface display method according to an exemplary aspect. Referring to FIG. 2, the method includes the following steps.

In step 201, an information display interface is displayed, the information display interface including a call entry of an intelligent interactive application.

In step 202, when a trigger operation on the call entry is detected, the intelligent interactive application is called.

In step 203, after displaying a first dynamic effect in which the call entry moves in the information display interface, an interactive interface of the intelligent interactive application is displayed.

In the method according to the aspect of the present disclosure, an information display interface is displayed, and when a trigger operation on a call entry is detected in the information display interface, an intelligent interactive application is called, and after a first dynamic effect in which the call entry moves in the information display interface is displayed, an interactive interface of the intelligent interactive application is displayed. In the process of calling the intelligent interactive application, the interactive interface of the intelligent interactive application is not directly displayed, but the first dynamic effect is displayed first and then the interactive interface is displayed. The process of displaying the interactive interface is smooth and natural, and the display effect is improved.

In a possible implementation, after displaying a first dynamic effect in which the call entry moves in the information display interface, displaying an interactive interface of the intelligent interactive application includes:

displaying a first dynamic effect in which the call entry gradually moves from an original position to a target position in the information display interface; and when the call entry is located at the target location and the intelligent interactive application is called successfully, displaying the interactive interface.

In another possible implementation, when the call entry is located at the target location and the intelligent interactive application is called successfully, displaying the interactive interface includes:

when the call entry moves to the target position, if the intelligent interactive application has been called successfully, displaying the interactive interface; or, when the call entry moves to the target location, if the intelligent interactive application is not called successfully, displaying a second dynamic effect, in which the call entry stays at the target location, until the intelligent interactive application is called successfully, and displaying the interactive interface.

In another possible implementation, the information display interface includes a search bar, an original position is located at a first end of the search bar, and a target position is located at a second end of the search bar.

In another possible implementation, the first dynamic effect is that the call entry gradually moves from the first end to the second end, and with the movement of the call entry, the search bar in an area passed by the call entry disappears.

In another possible implementation, after displaying a first dynamic effect in which the call entry moves in the information display interface, displaying an interactive interface of the intelligent interactive application includes:

displaying a first dynamic effect in which the call entry moves in the information display interface until the call of the intelligent interactive application is completed, and displaying the interactive interface.

In another possible implementation, displaying an interactive interface of the intelligent interactive application includes:

in the information display interface, the display of the interactive interface is floated.

In another possible implementation, the method further includes:

when it is determined that the intelligent interactive application is called unsuccessfully, displaying a third dynamic effect in which the call entry gradually moves to the original position in the information display interface.

In another possible implementation, an electronic device includes a designated application and an intelligent interactive application, and when a trigger operation on the call entry is detected, calling the intelligent interactive application includes:

when the designated application detects a trigger operation on the call entry, sending a call request to the intelligent interactive application; and when the designated application receives a call success message returned by the intelligent interactive application, determining that the intelligent interactive application is called successfully.

In another possible implementation, the method further includes:

when a close operation on the interactive interface is detected, displaying a fourth dynamic effect in which the call entry gradually moves to the original position in the information display interface after the interactive interface is closed.

In another possible implementation, the method further includes:

when a close operation on the interactive interface is detected, displaying a fifth dynamic effect, the fifth dynamic effect being that the call entry gradually moves from the second end to the first end after the interactive interface is closed, and with the movement of the call entry, the search bar in an area passed by the call entry appears.

In another possible implementation, the method further includes:

when inputted first interactive information is obtained based on the interaction interface, displaying second interactive information corresponding to the first interactive information in the interaction interface.

Figure 3:
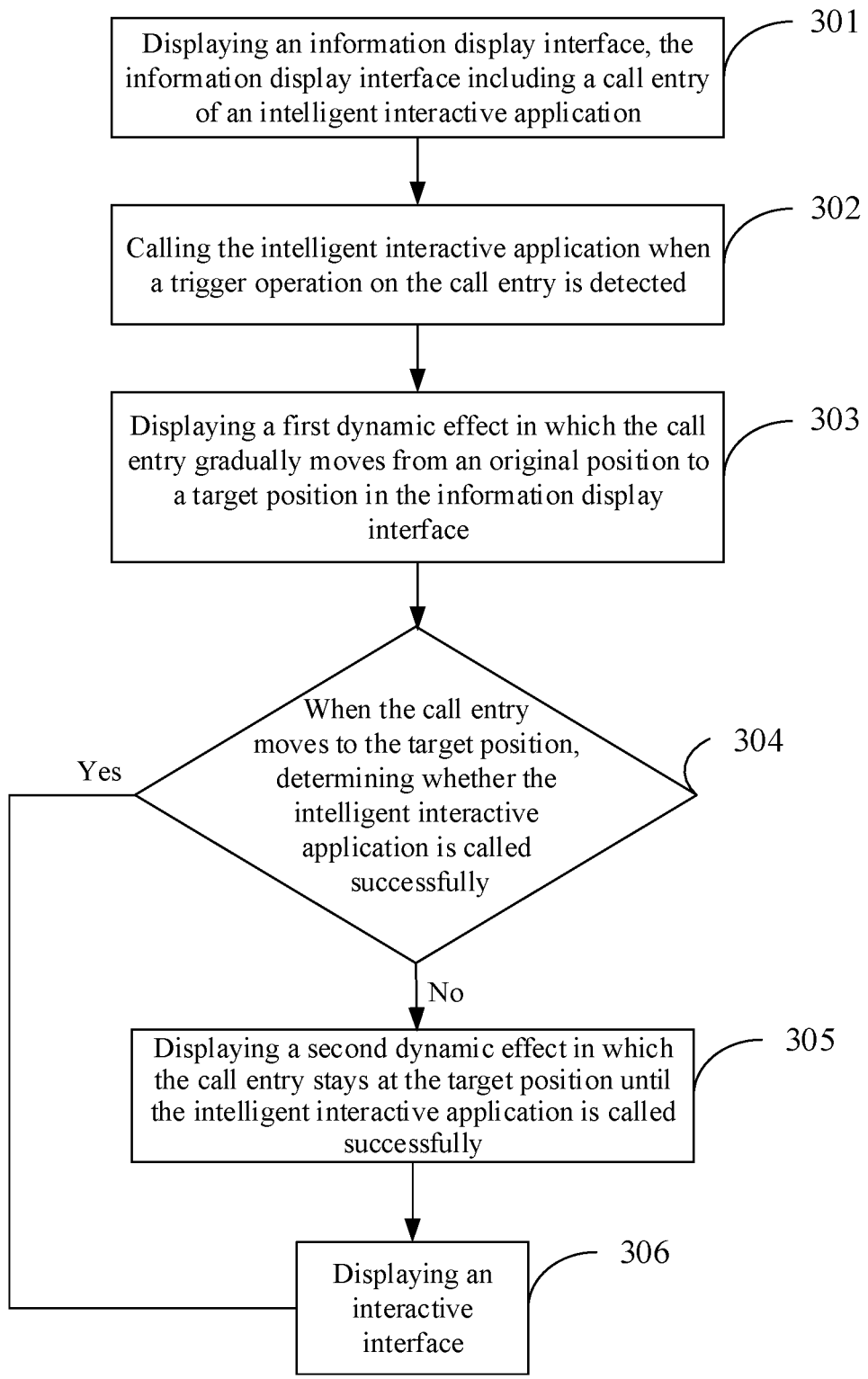
FIG. 3 is a flowchart of an interactive interface display method according to an exemplary aspect of the present disclosure.

FIG. 3 is a flowchart of an interactive interface display method according to an exemplary aspect. Referring to FIG. 3, the method is applied to an electronic device, and the electronic device may be a mobile phone, a computer, or a tablet computer. The method includes the following steps.

In step 301, an information display interface is displayed, the information display interface including a call entry of an intelligent interactive application.

The electronic device displays an information display interface. A call entry of an intelligent interactive application is displayed in the information display interface. Intelligent interactive applications are applications with interactive functions in electronic devices. The user can interact with intelligent interactive applications and control electronic devices to perform operations through intelligent interactive applications. The call entry is configured to call the intelligent interactive application. When the electronic device displays the information display interface, the user can trigger the call entry to call the intelligent interactive application.

The call entry may be an icon, a button, or another type of entry. The call entry may be an entry of any shape. The shape may be set by the electronic device or the user. The call entry can be displayed at any position on the information display interface, such as the upper left corner and the lower right corner. During the display process, the user can also move the call entry to change the position of the call entry.

In addition, the information display interface may be any one or more interfaces in the electronic device, or a main interface of the electronic device, or a designated interface in the electronic device, such as a negative-screen interface.

In step 302, when a trigger operation on the call entry is detected, the intelligent interactive application is called.

When the electronic device displays the information display interface, if the user wishes to call the intelligent interactive application, the call entry is triggered. When the electronic device detects a trigger operation on the call entry, the intelligent interaction application is called.

When the intelligent interactive application is in a closed state, calling the intelligent interactive application refers to launching the intelligent interactive application. When the intelligent interactive application is in a background running state, calling the intelligent interactive application refers to switching the intelligent interactive application to a foreground running state in order to display the interactive interface of the intelligent interactive application.

In a possible implementation, the electronic device includes a designated application and an intelligent interactive application. The designated application is configured to control the display of the information display interface. Then when a user triggers the call entry, the designated application will detect the trigger operation on the call entry. At this time, the designated application executes the steps of calling the intelligent interactive application. That is, the designated application sends a call request to the intelligent interactive application to request to call the intelligent interactive application. When the intelligent interactive application is called successfully, a call success message is sent to the designated application. When the designated application receives the call success message returned by the intelligent interactive application, it is determined that the intelligent interactive application is called successfully.

In step 303, a first dynamic effect is displayed in which the call entry gradually moves from an original position to a target position in the information display interface.

When the electronic device detects a trigger operation on the call entry, a first dynamic effect in which the call entry moves in the information display interface is also displayed, and the interactive interface of the intelligent interactive application is subsequently displayed after the first dynamic effect is displayed.

In a possible implementation, when a trigger operation on the call entry is detected and the position of the call entry is the original position, the first dynamic effect in which the call entry gradually moves from the original position to the target position is displayed at this time.

The original position and the target position may be any two different positions in the information display interface. For example, the original position is located in a lower right corner of the information display interface, and the target position is located in a lower left corner of the information display interface. In addition, the original position and the target position may be set by the electronic device by default, or may be set by the user.

In a possible implementation, the information display interface includes a search bar. The search bar is configured to trigger an information search function. The user can input a keyword to be searched in the search bar by voice input, text input, or other methods, and trigger a search instruction carrying the keyword. When the electronic device receives the search instruction, it performs a search according to the keyword, obtains a search result, and displays it in the information display interface.

In the aspect of the present disclosure, the original position and the target position may be set based on the search bar. For example, the search bar includes a first end and a second end. The original position of the call entry is located at the first end of the search bar, and the target position is located at the second end of the search bar. The search bar in the information display interface may be located at a top, bottom, or other position of the information display interface. The first end of the search bar can be left, and the second end is right. Or, the first end of the search bar can be right, and the second end is left.

The electronic device displaying a first dynamic effect in which the call entry gradually moves from an original position to a target position includes:

displaying a first dynamic effect in which the call entry gradually moves from the first end of the search bar to the second end of the search bar until the call entry moves to the second end of the search bar;

or, displaying a first dynamic effect in which the call entry gradually moves from the first end of the search bar to the second end of the search bar, and with the movement of the call entry, the search bar in an area passed by the call entry disappears until the call entry moves to the second end of the search bar and the search bar disappears completely.

Figure 4:
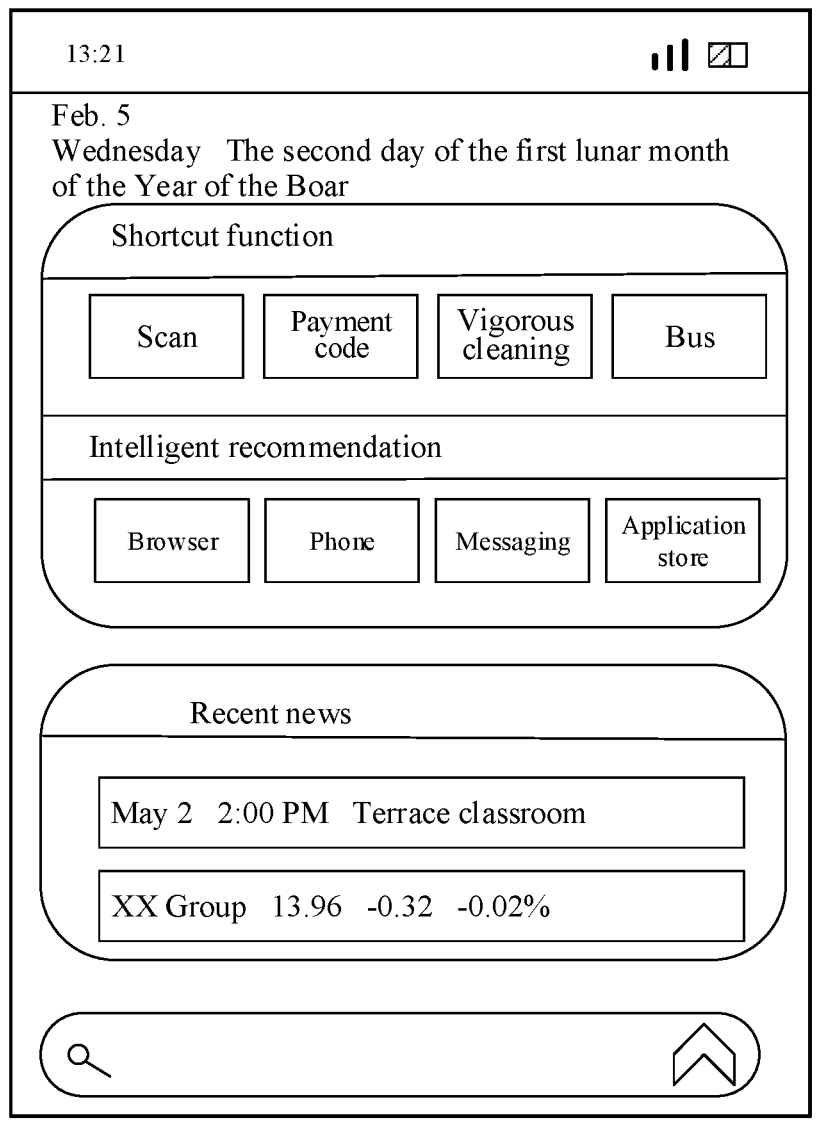
FIG. 4 is a schematic diagram of an information display interface according to an exemplary aspect of the present disclosure.
Figure 5:
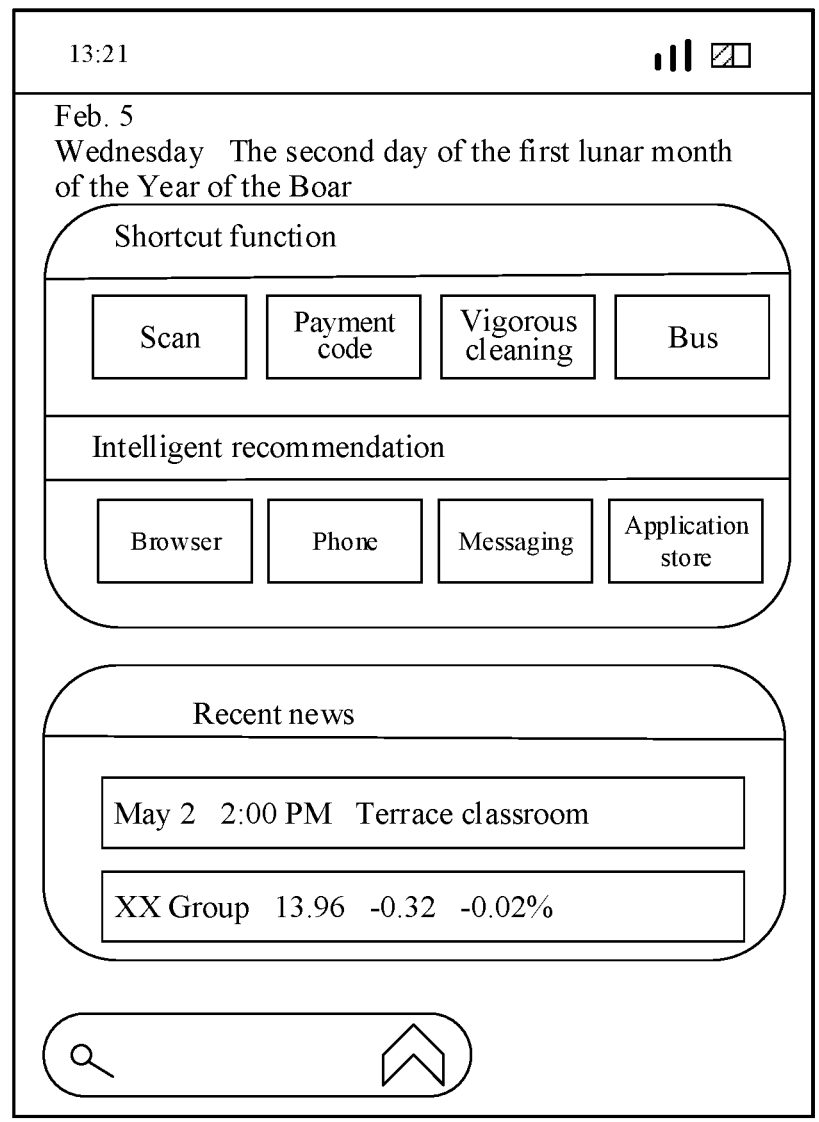
FIG. 5 is a schematic diagram of another information display interface according to an exemplary aspect of the present disclosure.

FIG. 4 is a schematic diagram of an information display interface according to an exemplary aspect. FIG. 5 is a schematic diagram of another information display interface according to an exemplary aspect. As shown in FIG. 4, a search bar is displayed at a bottom of the information display interface, a search button is displayed on a left of the search bar, and a call entry of the intelligent interactive application is located on the right of the search bar. As shown in FIG. 5, when the electronic device detects a trigger operation on the call entry through the information display interface, the call entry gradually moves from the right of the search bar to the left, the search bar in an area passed by the call entry disappears, and the search bar in an area that has not been passed is still displayed.

A first point that needs to be explained is that the aspect of the present disclosure is only described by taking the electronic device displaying a first dynamic effect in which the call entry gradually moves from an original position to a target position as an example. In another aspect, the first dynamic effect may be any effect as long as the first dynamic effect, in which the call entry moves in the information display interface, is displayed. For example, the first dynamic effect may be an effect in which the call entry moves according to a preset trajectory in the information display interface, and the preset trajectory may be set by the electronic device or the user.

The second point that needs to be explained is that the above step 303 is performed in parallel with the above step 302, and the first dynamic effect can be displayed during the process of the electronic device calling the intelligent interactive application.

In step 304, when the call entry moves to the target position, it is determined whether the intelligent interactive application is called successfully. If so, step 306 is performed, and if not, step 305 is performed.

Only when the intelligent interactive application is called successfully, the interactive interface of the intelligent interactive application can be displayed. The process of calling the intelligent interactive application may take some time. When the call entry moves to the target position, the intelligent interactive application may not be called successfully, and the interactive interface may not be displayed at this time.

For this reason, when the call entry moves to the target position, it is determined whether the intelligent interactive application is called successfully so as to display according to the determination result. When the intelligent interactive application is called successfully, step 306 is performed, and when the intelligent interactive application is not called successfully, step 305 is performed.

In step 305, a second dynamic effect in which the call entry stays at the target position is displayed until the intelligent interactive application is called successfully, and step 306 is performed.

When the call entry moves to the target position, but the intelligent interactive application has not been called successfully, the interactive interface cannot be displayed. At this time, in order to ensure the display effect, a second dynamic effect that the call entry stays at the target position is displayed. The user knows that it is currently waiting for the calling the intelligent interactive application when the user sees the second dynamic effect. When the intelligent interactive application is called successfully, the interactive interface is displayed instead of the second dynamic effect.

The second dynamic effect may be an effect that the call entry rotates at the target position, or an effect that the call entry blinks at the target position, or may be other effects.

Figure 6:
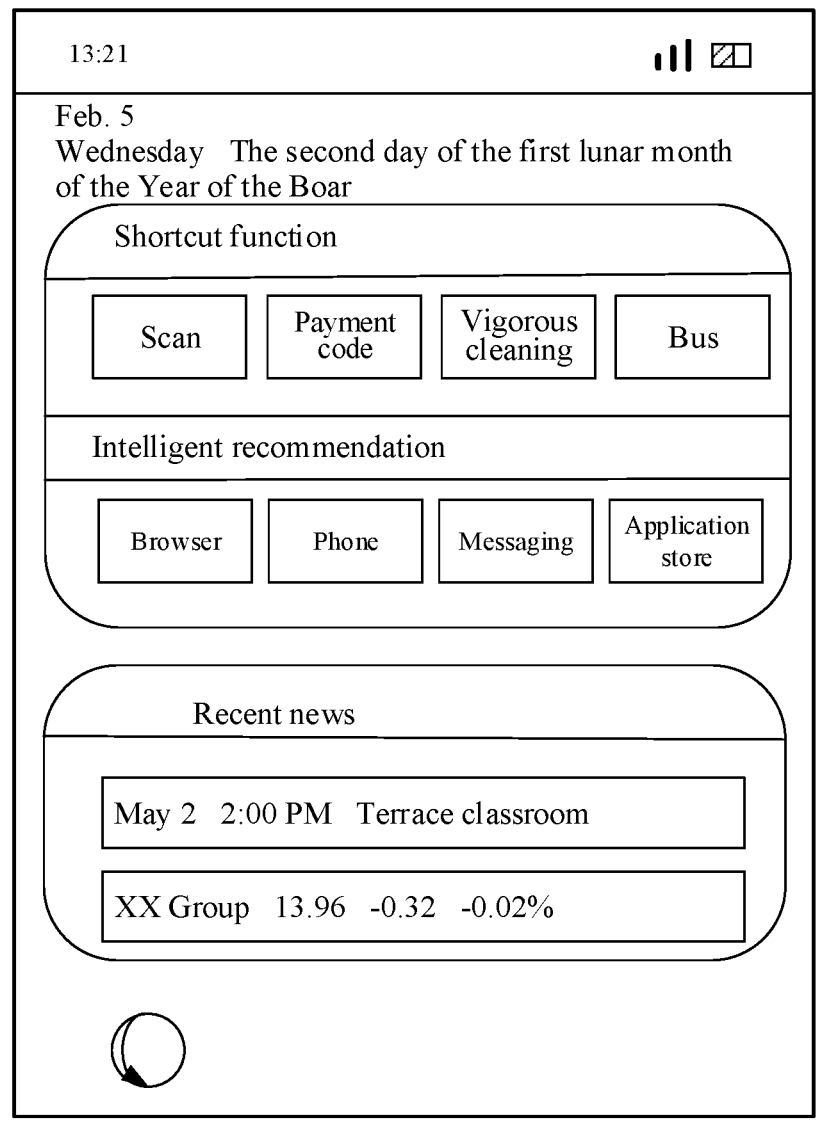
FIG. 6 is a schematic diagram of another information display interface according to an exemplary aspect of the present disclosure.

Based on the examples in FIG. 4 and FIG. 5, when the call entry moves to the left of the search bar, but the intelligent interactive application has not been called successfully, a second dynamic effect in which the call entry rotates on the left of the search bar is displayed, as shown in FIG. 6.

In step 306, an interactive interface is displayed.

When the call entry moves to the target position, if the intelligent interactive application is called successfully, the interactive interface is directly displayed, so that the interactive interface can be displayed after the first dynamic effect is displayed. Or, when the call entry moves to the target position, but the intelligent interactive application has not been called successfully, the second dynamic effect is displayed until the intelligent interactive application is called successfully, and the interactive interface is displayed, so that after the first dynamic effect and the second dynamic are displayed, the interactive interface is displayed. In the subsequent process, the user can interact with the electronic device based on the interactive interface.

Figure 7:
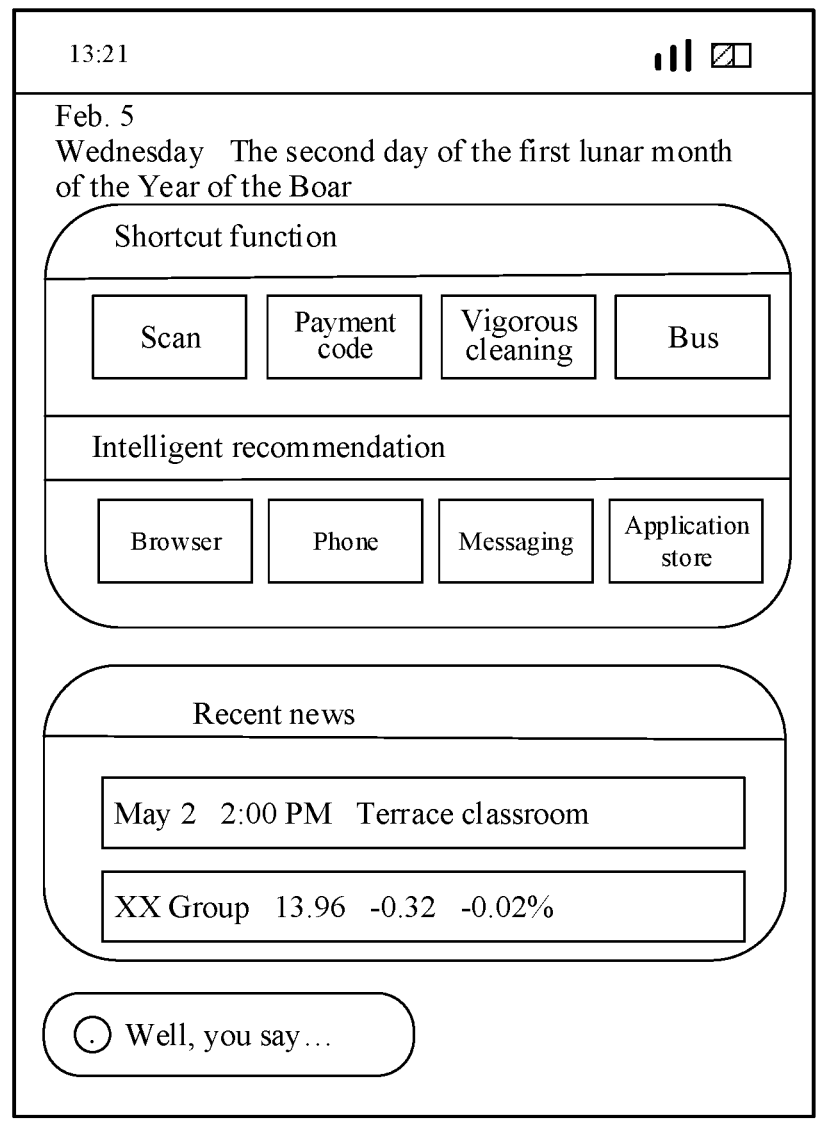
FIG. 7 is a schematic diagram of an interactive interface according to an exemplary aspect of the present disclosure.

Based on the examples of FIGS. 4 to 6, when the call entry is located on the left of the search bar and the intelligent interactive application is called successfully, the interactive interface shown in FIG. 7 is displayed.

In a possible implementation, the electronic device may display the interactive interface in a floating manner in the information display interface, and the interactive interface is displayed on an upper layer of the information display interface.

For example, the electronic device creates a float layer on the upper layer of the information display interface, displays the interactive interface in the float layer, and can display the information display interface in the areas expect the interactive interface. Alternatively, when the interactive interface is displayed in the float layer, the information display interface on the area expect the interactive interface may be blurred to make the information display interface appear semi-transparent. Gaussian Blur technology can be used for blurring. The interface generated by this technology is visually similar to observing the interface through a semi-transparent screen, which can play the effect of blurring and can be more prominently display the interactive interface.

In another possible implementation, the electronic device may switch from the information display interface to the interactive interface and no longer display the information display interface.

When the electronic device switches from the information display interface to the interactive interface, a dynamic effect of gradually switching from the information display interface to the interactive interface may be displayed.

In another possible implementation, when the call entry moves to the target position and the intelligent interactive application is called successfully, the electronic device may directly display the interactive interface, or may also first display a dynamic effect in which the interactive interface gradually appears until the interactive interface is fully displayed. The interactive interface may appear from the target location where the call entry is currently located, or from another location.

The dynamic effect that the interactive interface gradually appears may be a dynamic effect that the interactive interface gradually appears from a bottom. That is, the interactive interface gradually expands from the bottom of the information display interface to a top of the information display interface until the size of the interactive interface is equal to a preset size. Alternatively, it may also be a dynamic effect that the interactive interface gradually expands from a center of the information display interface to the surroundings. That is, the interactive interface gradually expands from the center of the information display interface to the surroundings until the size of the interactive interface is equal to a preset size.

The preset size may be smaller than the size of the display screen of the electronic device or equal to the size of the display screen of the electronic device. In addition, in the process that the user interacts with the electronic device based on the interactive interface, the electronic device can adjust the size of the interactive interface according to the amount of information to be displayed in the interactive interface to ensure the complete display of the information.

It should be noted that the aspect of the present disclosure is only based on an example of displaying the interactive interface when the intelligent interactive application is called successfully. In another aspect, during the process of the electronic device calling the intelligent interactive application, if the intelligent interactive application is failed or other problems occur, it may lead to unsuccessful call of the intelligent interactive application. At this time, the electronic device no longer displays the interactive interface, but displays a third dynamic effect in which the call entry gradually moves to the original position in the information display interface.

The manner in which the electronic device determines that the intelligent interactive application is called unsuccessfully may include:

setting a preset duration. When the electronic device detects a trigger operation on the call entry, it starts timing. When the counted time reaches the preset duration, but the electronic device has not received a call success message returned by the intelligent interactive application, it is determined that the intelligent interactive application is called unsuccessfully. The preset duration can be set by the electronic device or the user. For example, the preset duration may be 1 second, 2 seconds, or other durations.

In a possible implementation, if the information display interface includes a search bar, the original position is located at the first end of the search bar, the target position is located at the second end of the search bar, and the search bar in an area passed by the call entry disappears during the process where the call entry moves from the original position to the target position, displaying a third dynamic effect in which the call entry gradually moves to the original position in the information display interface includes: when it is determined that the intelligent interactive application is called unsuccessfully, displaying a dynamic effect in which the call entry gradually moves from the second end to the first end, and with the movement of the call entry, the search bar in an area passed by the call entry appears.

In the method according to the aspect of the present disclosure, an information display interface is displayed, and when a trigger operation on a call entry is detected in the information display interface, an intelligent interactive application is called, and after a first dynamic effect in which the call entry moves in the information display interface is displayed, an interactive interface of the intelligent interactive application is displayed. In the process of calling the intelligent interactive application, the interactive interface of the intelligent interactive application is not directly displayed, but the first dynamic effect is displayed first and then the interactive interface is displayed. The process of displaying the interactive interface is smooth and natural, and the display effect is improved.

Figure 8:
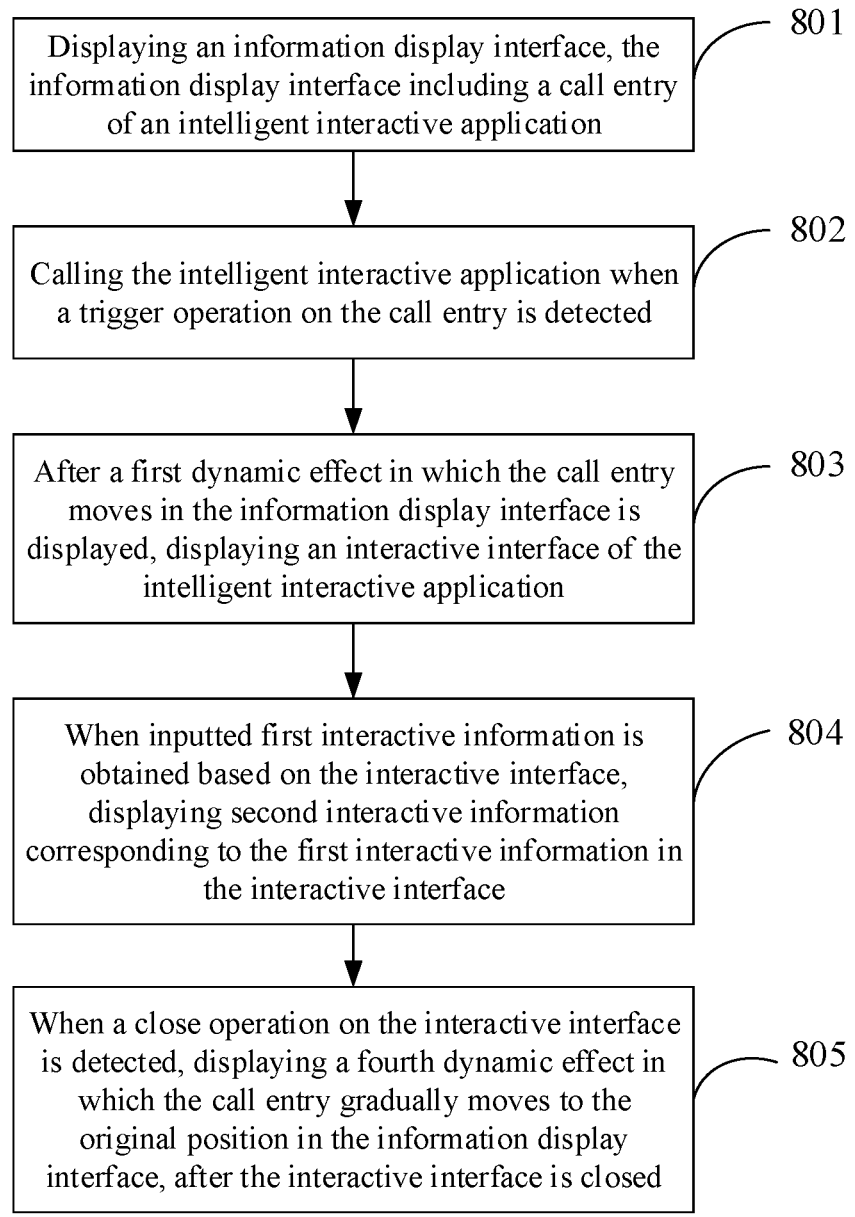
FIG. 8 is a flowchart of an interactive interface display method according to an exemplary aspect of the present disclosure.

FIG. 8 is a flowchart of an interactive interface display method according to an exemplary aspect. Referring to FIG. 8, the method includes the following steps.

In step 801, an information display interface is displayed, the information display interface including a call entry of an intelligent interactive application.

In step 802, when a trigger operation on the call entry is detected, the intelligent interactive application is called.

In step 803, after displaying a first dynamic effect in which the call entry moves in the information display interface, an interactive interface of the intelligent interactive application is displayed.

Steps 801-803 in this aspect of the present disclosure are similar to steps 301-306 in the previous aspect, and details are not described herein again.

In step 804, when inputted first interactive information is obtained based on the interactive interface, second interactive information corresponding to the first interactive information is displayed in the interactive interface.

A user inputs first interactive information in the interactive interface. When obtaining the inputted first interactive information based on the interactive interface, the electronic device displays second interactive information corresponding to the first interactive information in the interactive interface.

The input method of the first interactive information may include the following situations.

In a possible implementation, when the electronic device displays the interactive interface, a voice entry function is enabled. At this time, the user inputs voice information, and the electronic device obtains the voice information inputted by the user as the first interactive information.

In another possible implementation, the electronic device displays an input field in the interactive interface, the user enters text information in the input field, and the electronic device obtains the text information inputted by the user as the first interactive information.

In addition, the contents of the first interactive information are different, the operations performed by the electronic device are also different, and the second interactive information displayed is also different. The electronic device identifies the first interactive information, and understands the content in the first interactive information. When determining that the first interactive information is a keyword for which a search is requested, the electronic device performs a search based on the keyword to obtain a search result as the second interactive information and displays the search result in the interactive interface.

Figure 9:
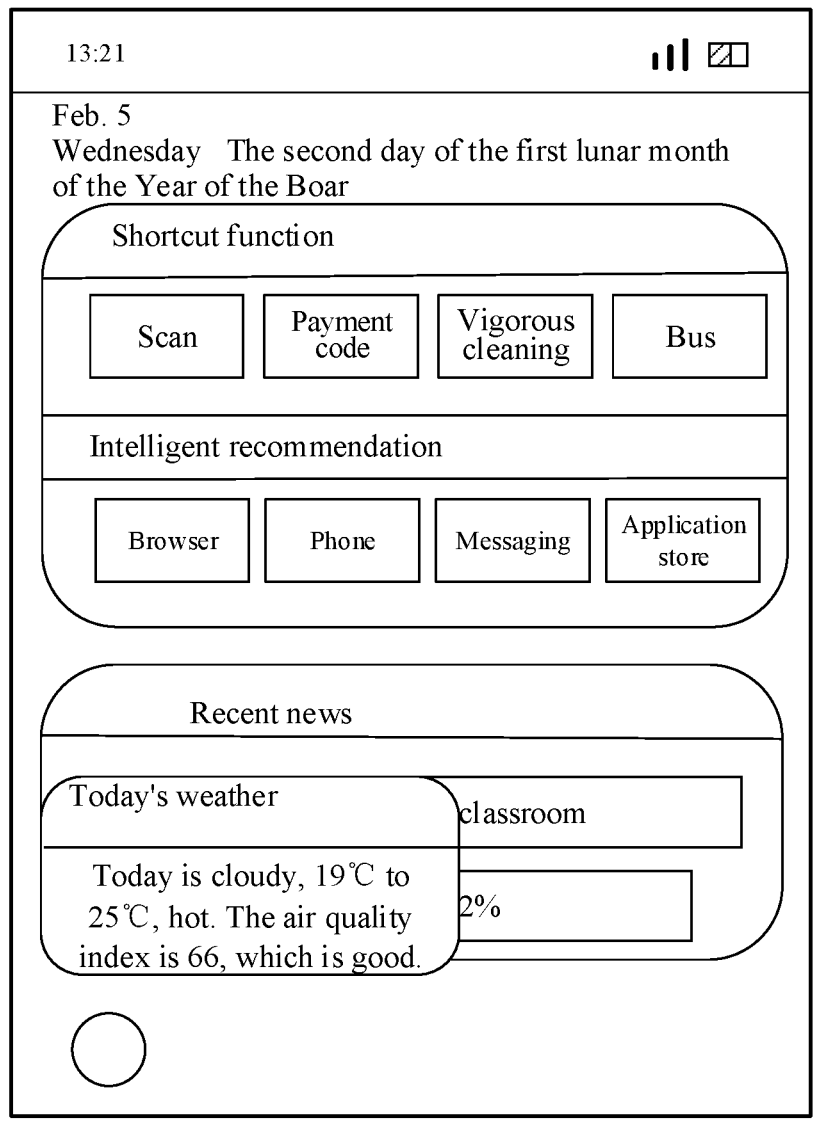
FIG. 9 is a schematic diagram of another interactive interface according to an exemplary aspect of the present disclosure.

FIG. 9 is a schematic diagram of another interactive interface according to an exemplary aspect. Referring to FIG. 9, the first interactive information is "current weather". The electronic device obtains the first interactive information based on the interactive interface, obtains the current weather information according to the first interactive information, and displays the current weather information in the interactive interface.

When the electronic device determines that the first interactive information is control information that controls the operating state of the electronic device, the operating state of the electronic device is controlled according to the control information to obtain an operation result, which is displayed as the second interactive information in the interactive interface.

For example, the first interactive information is to control the electronic device to switch from a mobile cellular network to a wireless network. The electronic device switches from the mobile cellular network to the wireless network according to the first interactive information and displays a notification message of successful network switching in the interactive interface.

In step 805, when a close operation on the interactive interface is detected, a fourth dynamic effect is displayed that the call entry gradually moves to the original position in the information display interface after the interactive interface is closed.

When the user does not need to interact with the intelligent interactive application, an operation of closing the interactive interface is triggered. When the electronic device detects the close operation of the interactive interface, a fourth dynamic effect is displayed that the call entry gradually moves to the original position in the information display interface after the interactive interface is closed.

The close operation of the interactive interface may be an operation of clicking a close button in the interactive interface, an operation of long-pressing the interactive interface, an operation of double-clicking the interactive interface, and the like.

In this fourth dynamic effect, the effect that the interactive interface is closed may be an effect that the interactive interface is gradually shrunk in a direction pointing to the call entry until the interactive interface disappears at the position where the call entry is located, or it may be an effect that the interactive interface gradually fades until it disappears, or other effects.

In this fourth dynamic effect, the effect that the call entry gradually moves to the original position in the information display interface may be an effect of gradually moving to the original position according to a preset trajectory. The preset trajectory may be any trajectory, or may be a trajectory when the call entry moves from the original position to the target position, or may be other effects.

In a possible implementation, if the electronic device creates a float layer on the upper layer of the information display interface and displays the interactive interface in the float layer, the fourth dynamic effect is: am effect that after the interactive interface is closed, the float layer gradually disappears, and then the call entry gradually moves to the original position in the information display interface.

In another possible implementation, if the information display interface includes a search bar, and the first dynamic effect is that the call entry gradually moves from a first end to a second end, and with the movement of the call entry, the search bar in an area passed by the call entry disappears, then when a close operation on the interactive interface is detected, a fifth dynamic effect is displayed. The fifth dynamic effect is that the call entry gradually moves from the second end to the first end after the interactive interface is closed, and with the movement of the call entry, the search bar in the area passed by the call entry appears until the call entry moves to the first end, and the search bar appears completely.

In the method according to the aspect of the present disclosure, a call entry of an intelligent interactive application is displayed in an information display interface. When a trigger operation on the call entry is detected, the intelligent interactive application is called. After displaying a first dynamic effect that the call entry moves in the information display interface, an interactive interface of the intelligent interactive application is displayed. When inputted first interactive information is obtained based on the interactive interface, second interactive information corresponding to the first interactive information is displayed in the interactive interface. When a close operation on the interactive interface is detected, a fourth dynamic effect is displayed that the call entry gradually moves to the original position in the information display interface after the display interactive interface is closed. The first dynamic effect is displayed during the process of calling the intelligent interactive application, and the process of displaying the interactive interface is smooth and natural. It is convenient for the user to control the electronic device by interacting with the user by the interactive interface. When the interactive interface is closed, a dynamic effect that the call entry gradually moves to the original position in the information display interface can also be displayed. The process of closing the interactive interface is smooth and natural, and the display effect is improved.

Figure 10:
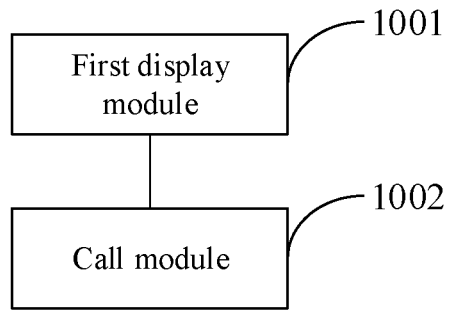
FIG. 10 is a schematic structural diagram of an interactive interface display apparatus according to an exemplary aspect of the present disclosure.

FIG. 10 is a schematic structural diagram of an interactive interface display apparatus according to an exemplary aspect. Referring to FIG. 10, the apparatus includes:

a first display module 1001 configured to display an information display interface, the information display interface including a call entry of an intelligent interactive application; and a call module 1002 configured to call the intelligent interactive application when a trigger operation on the call entry is detected; and the first display module 1001 is further configured to display an interactive interface of the intelligent interactive application after a first dynamic effect that the call entry moves in the information display interface is displayed.

In the apparatus according to the aspect of the present disclosure, an information display interface is displayed, and when a trigger operation on a call entry is detected in the information display interface, an intelligent interactive application is called, and after a first dynamic effect in which the call entry moves in the information display interface is displayed, an interactive interface of the intelligent interactive application is displayed. In the process of calling the intelligent interactive application, the interactive interface of the intelligent interactive application is not directly displayed, but the first dynamic effect is displayed first and then the interactive interface is displayed. The process of displaying the interactive interface is smooth and natural, and the display effect is improved.

Figure 11:
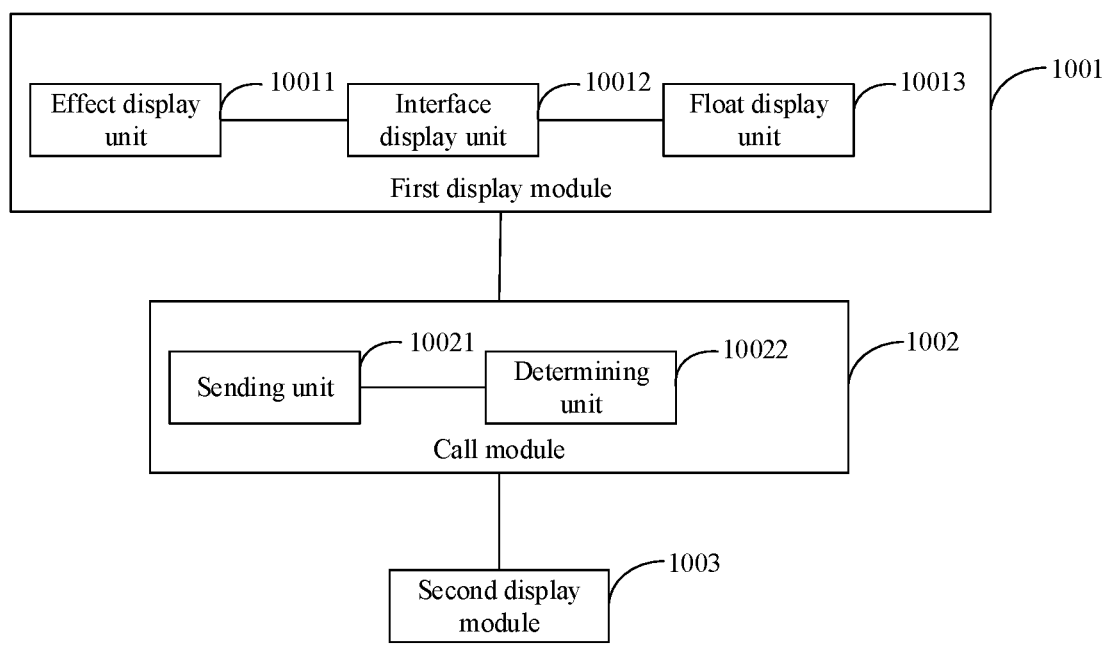
FIG. 11 is a schematic structural diagram of another interactive interface display apparatus according to an exemplary aspect of the present disclosure.

In a possible implementation, referring to FIG. 11, the first display module 1001 includes:

an effect display unit 10011 configured to display a first dynamic effect in which the call entry gradually moves from an original position to a target position in the information display interface; and an interface display unit 10012 configured to display the interactive interface when the call entry is located at the target location and the intelligent interactive application is called successfully.

In another possible implementation, the interface display unit 10012 is further configured to:

when the call entry moves to the target position, if the intelligent interactive application has been called successfully, display the interactive interface; or, when the call entry moves to the target location, if the intelligent interactive application has not been successfully called, display a second dynamic effect, in which the call entry stays at the target location, until the intelligent interactive application is called successfully, and display the interactive interface.

In another possible implementation, the information display interface includes a search bar, the original position is located at a first end of the search bar, and the target position is located at a second end of the search bar.

In another possible implementation, the first dynamic effect is that the call entry gradually moves from the first end to the second end, and with the movement of the call entry, the search bar in an area passed by the call entry disappears.

In another possible implementation, the first display module 1001 is further configured to display a first dynamic effect, in which the call entry moves in the information display interface, until the call of the intelligent interactive application is completed, and display the interactive interface.

In another possible implementation, referring to FIG. 11, the first display module 1001 includes:

a float display unit 10013 configured to display the interactive interface in a floating manner in the information display interface.

In another possible implementation, the first display module 1001 is further configured to display a third dynamic effect in which the call entry gradually moves to the original position in the information display interface, when it is determined that the intelligent interactive application is called unsuccessfully.

In another possible implementation, the electronic device includes a designated application and an intelligent interactive application, and the call module is located in the designated application. Referring to FIG. 11, the call module 1002 includes:

a sending unit 10021 configured to send a call request to the intelligent interactive application when a trigger operation on the call entry is detected; and a determining unit 10022 configured to determine that the intelligent interactive application is called successfully when a call success message returned by the intelligent interactive application is received.

In another possible implementation, the first display module 1001 is further configured to display a fourth dynamic effect in which the call entry gradually moves to the original position in the information display interface after the interactive interface is closed, when a close operation on the interactive interface is detected.

In another possible implementation, the first display module 1001 is further configured to display a fifth dynamic effect when a close operation on the interactive interface is detected. The fifth dynamic effect is that the call entry gradually moves from the second end to the first end, and with the movement of the call entry, the search bar in an area passed by the call entry appears.

In another possible implementation, referring to FIG. 11, the apparatus further includes:

a second display module 1003 configured to display second interactive information corresponding to the first interactive information in the interactive interface, when first inputted interactive information is obtained based on the interactive interface.

It should be noted that the interactive interface display apparatus provided by the present aspect only takes division of all the functional modules as an example for explanation when displaying interactive interfaces. In practice, the above functions can be finished by the different functional modules as required. That is, the internal structure of the apparatus is divided into different functional modules to finish all or part of the functions described above. In addition, the interactive interface display apparatus provided by the present aspect has the same concept as the interactive interface display method provided by the foregoing aspect. Refer to the method aspect for the designated implementation process of the method, which will not be repeated herein.

Figure 12:
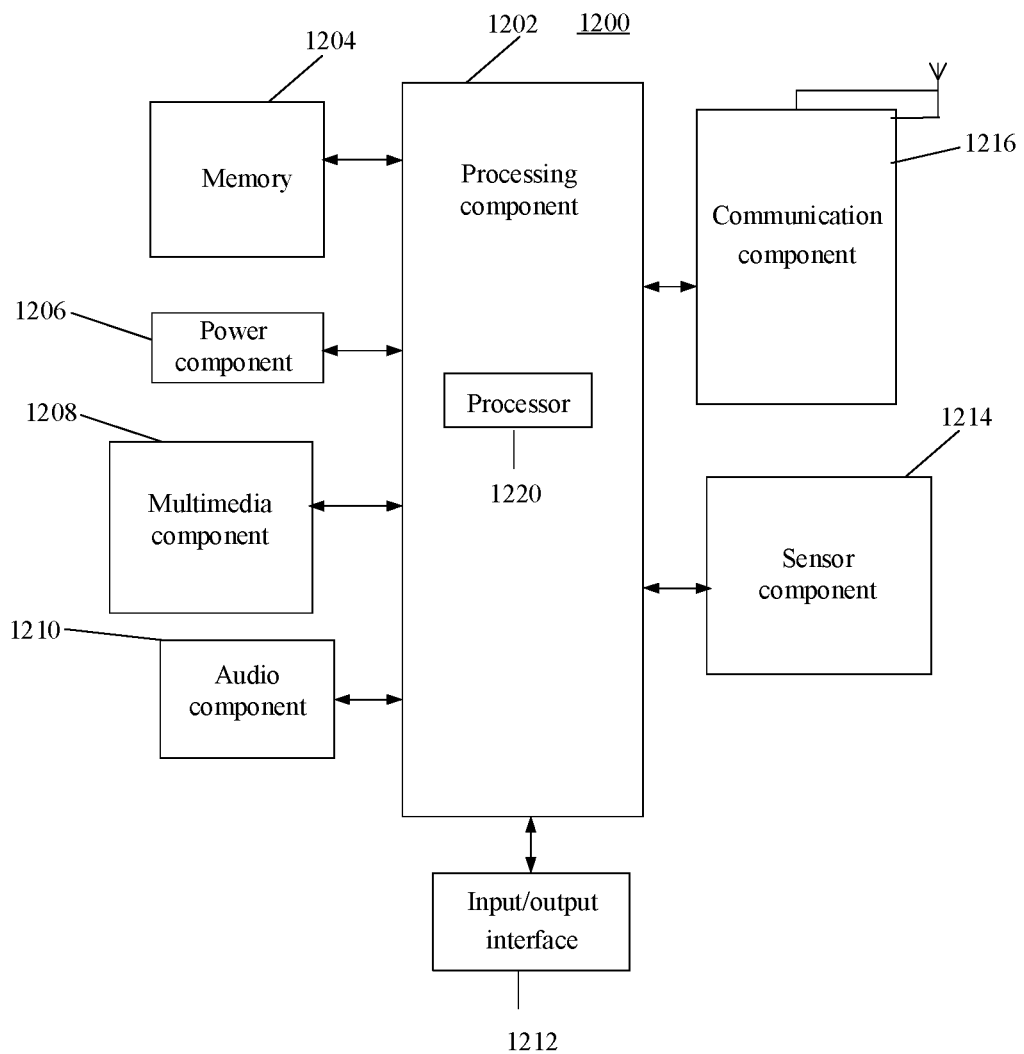
FIG. 12 is a block diagram of an electronic device according to an exemplary aspect of the present disclosure.

FIG. 12 is a block diagram of an electronic apparatus 1200 according to an exemplary aspect of the present disclosure. For example, the apparatus 1200 may be a mobile phone, a computer, a digital broadcast terminal, a message transceiver device, a game console, a tablet device, a piece of medical equipment, a piece of fitness equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some aspects, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some aspects, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a complementary metal oxide semiconductor (CMOS) or charge-coupled device (CCD) image sensor, for use in imaging applications. In some aspects, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as WiFi, 2G, or 3G, or a combination thereof. In one exemplary aspect, the communication component 1216 receives a broadcast signal or broadcast associated information from an external broadcast management system via a broadcast channel. In one exemplary aspect, the communication component 1216 further includes a near field communication (NFC) module to facilitate short-range communications.

In exemplary aspects, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above interactive interface display methods.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

In exemplary aspects, there is also provided a non-temporary computer-readable storage medium including instructions, such as the memory 1204 including instructions. These instructions may be loaded and executed by the processor 1220 in the apparatus 1200 for executing the above methods. For example, the non-transitory computer readable storage medium may be a ROM, a random-access memory (RAM), a CD-ROM, a magnetic tape, a floppy disk, an optical data storage device or the like.

Other aspects of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and aspects are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for interactive interface display, comprising:
displaying an information display interface including a call entry of an intelligent interactive application, wherein the call entry is pre-displayed in the information display interface and is configured to call the intelligent interactive application;
calling the intelligent interactive application when a trigger operation on the call entry is detected;
displaying a first dynamic effect in which the call entry gradually moves from an original position to a target position in the information display interface;
determining whether the intelligent interactive application has been called successfully when the call entry moves to the target position; and
displaying, when it is determined that the intelligent interactive application has not been called successfully, a second dynamic effect in which the call entry stays at the target position, until the intelligent interactive application has been called successfully, and then displaying an interactive interface of the intelligent interactive application, thereby displaying the first dynamic effect and the second dynamic effect successively in the information display interface before displaying the interactive interface.

2. The method according to claim 1, wherein the information display interface comprises a search bar which is configured to trigger an information search function, the original position is located at a first end of the search bar, and the target position is located at a second end of the search bar.

3. The method according to claim 2, wherein the first dynamic effect is that the call entry gradually moves from the first end of the search bar to the second end of the search bar, and with a movement of the call entry, the search bar in an area passed by the call entry disappears, and a shape of the call entry remains unchanged during the movement.

4. The method according to claim 2, further comprising:
displaying a fifth dynamic effect when a close operation on the interactive interface is detected, the fifth dynamic effect being that after the interactive interlace is closed, the call entry gradually moves from the second end to the first end, and with the movement of the call entry, the search bar in an area passed by the call entry appears.

5. The method according to claim 1, further comprising:
displaying the interactive interface when the call entry moves to the target position and the intelligent interactive application has been called successfully.

6. The method according to claim 1, further comprising:
when it is determined that the intelligent interactive application is called unsuccessfully, displaying a third dynamic effect in which the call entry gradually moves to an original position in the information display interface.

7. The method according to claim 1, further comprising:
when a close operation on the interactive interface is detected, displaying a fourth dynamic effect in which the call entry gradually moves to an original position in the information display interface after the interactive interface is closed.

8. The method according to claim 1, wherein when the intelligent interactive application is in a closed state, calling the intelligent interactive application refers to launching the intelligent interactive application; and
when the intelligent interactive application is in a background running state, calling the intelligent interactive application refers to switching the intelligent interactive application to a foreground running state, to display the interactive interface of the intelligent interactive application.

9. An apparatus for interactive interlace display, comprising:
a processor; and
a memory for storing instructions executable by the processor,
wherein the processor is configured to:
display an information display interface including a call entry of an intelligent interactive application, wherein the call entry is pre-displayed in the information display interface and is configured to call the intelligent interactive application;
call the intelligent interactive application when a trigger operation on the call entry is detected;

display a first dynamic effect in which the call entry gradually moves from an original position to a target position in the information display interface;
determine whether the intelligent interactive application has been called successfully when the call entry moves to the target position; and
display, when it is determined that the call entry moves to the target position and the intelligent interactive application has not been called successfully, a second dynamic effect, in which the call entry stays at the target position, until the intelligent interactive application has been called successfully, and then display an interactive interface of the intelligent interactive application,
thereby displaying the first dynamic effect and the second dynamic effect successively in the information display interface before displaying the interactive interface.

10. The apparatus according to claim 9, wherein the information display interface comprises a search bar which is configured to trigger an information search function, the original position is located at a first end of the search bar, and the target position is located at a second end of the search bar.

11. The apparatus according to claim 10, wherein the first dynamic effect is that the call entry gradually moves from the first end of the search bar to the second end of the search bar, and with a movement of the call entry, the search bar in an area passed by the call entry disappears, and a shape of the call entry remains unchanged during the movement.

12. The apparatus according to claim 11, wherein the processor is further configured to display a fifth dynamic effect when a close operation on the interactive interface is detected, the fifth dynamic effect being that after the interactive interface is closed, the call entry gradually moves from the second end to the first end and with the movement of the call entry, the search bar in an area passed by the call entry appears.

13. The apparatus according to claim 9, wherein the processor is further configured to:
display the interactive interface when the call entry moves to the target position and the intelligent interactive application has been called successfully.

14. The apparatus according to claim 9, wherein the processor is further configured to, when it is determined that the intelligent interactive application is called unsuccessfully, display a third dynamic effect in which the call entry gradually moves to an original position in the information display interface.

15. The apparatus according to claim 9, wherein the processor is further configured to, when a close operation on the interactive interface is detected, display a fourth dynamic effect in which the call entry gradually moves to an original position in the information display interface after the interactive interface is closed.

16. A non-transitory computer-readable medium storing instructions that, when executed by one or more processors of a device, cause the device to:
display an information display interface including a call entry of an intelligent interactive application, wherein the call entry is pre-displayed in the information display interface and is configured to call the intelligent interactive application;
call the intelligent interactive application when a trigger operation on the call entry is detected;

display a first dynamic effect in which the call entry gradually moves from an original position to a target position in the information display interface;
determine whether the intelligent interactive application has been called successfully when the call entry moves to the target position; and
display, when it is determined that the intelligent interactive application has not been called successfully, a second dynamic effect, in which the call entry stays at the target position, until the intelligent interactive application has been called successfully, and then display an interactive interface of the intelligent interactive application,
thereby displaying the first dynamic effect and the second dynamic effect successively in the information display interface before displaying the interactive interface.

* * * * *